United States Patent
Dominguez-Montes

(10) Patent No.: US 9,964,771 B2
(45) Date of Patent: May 8, 2018

(54) SYSTEM FOR REPRODUCING STEREOSCOPIC IMAGES BY PROJECTION

(71) Applicant: Juan Dominguez-Montes, Las Rozas (ES)

(72) Inventor: Juan Dominguez-Montes, Las Rozas (ES)

( * ) Notice: Subject to any disclaimer, the term of this patent is extended or adjusted under 35 U.S.C. 154(b) by 0 days. days.

(21) Appl. No.: 15/319,169

(22) PCT Filed: Jun. 15, 2015

(86) PCT No.: PCT/EP2015/063286
§ 371 (c)(1),
(2) Date: Dec. 15, 2016

(87) PCT Pub. No.: WO2015/193222
PCT Pub. Date: Dec. 23, 2015

(65) Prior Publication Data
US 2017/0123220 A1     May 4, 2017

(30) Foreign Application Priority Data

Jun. 16, 2014    (EP) .................................... 14382226

(51) Int. Cl.
*G02B 27/22*     (2018.01)
*G02B 27/26*     (2006.01)
*G03B 35/20*     (2006.01)

(52) U.S. Cl.
CPC ..... *G02B 27/2214* (2013.01); *G02B 27/2207* (2013.01); *G02B 27/2264* (2013.01); *G02B 27/26* (2013.01); *G03B 35/20* (2013.01)

(58) Field of Classification Search
CPC ................ G03B 21/006; G03B 21/625; G03B 21/2053; G03B 35/00; G03B 35/04;
(Continued)

(56) References Cited

U.S. PATENT DOCUMENTS 5,956,001 A * 9/1999 Sumida .............. G02B 27/2214
                                                  345/55
2002/0030887 A1    3/2002   Hamagishi et al.
(Continued)

FOREIGN PATENT DOCUMENTS

WO    WO-2015193222      12/2015

OTHER PUBLICATIONS

"International Application No. PCT/EP2015/063286, International Search Report and Written Opinion dated Aug. 21, 2015", (Aug. 21, 2015), 7 pgs.

(Continued)

*Primary Examiner* — Sultan Chowdhury
(74) *Attorney, Agent, or Firm* — Schwegman Lundberg & Woessner, P.A.

(57) ABSTRACT

The present invention relates to a system for reproducing stereoscopic images comprising a projection screen, a projector, a first optical device, comprising a matrix of converging lenses having a focal distance $f_1$, located in front of the projection screen, at a distance equal to twice the focal distance, a second optical device located in the focal plane of the first optical device and comprising a matrix of converging lenses, having a focal distance $f_2$ equal to half the focal distance $f_1$, located between the first optical device and the projection screen, and a third optical device located between the second optical device and the projection screen, in contact with the second optical device, the third optical device comprising a matrix of discriminating elements.

15 Claims, 13 Drawing Sheets

(58) Field of Classification Search
CPC .... G03B 35/18; G03B 35/24; H04N 13/0018; H04N 13/0059; H04N 13/0225; H04N 13/0232; H04N 13/0456; G02B 27/22; G02B 27/2214; G02B 27/2228; G02B 27/2264
See application file for complete search history.

(56) References Cited

U.S. PATENT DOCUMENTS

2006/0244918 A1  11/2006 Cossairt et al.
2015/0212333 A1* 7/2015 Goulanian ......... H04N 13/0402
                                                     353/7

OTHER PUBLICATIONS

Takemori, D., et al., "Invited Paper: 3-D Display with Large Double Lenticular Screens", 1995 SID International Symposium Digest of Technical Papers, Orlando, May 23-25, 1995, SID 95 Digest, vol. 26, pp. 55-58, (May 23, 1995), 55-58.

* cited by examiner

SYSTEM FOR REPRODUCING STEREOSCOPIC IMAGES BY PROJECTION

PRIORITY CLAIM TO RELATED APPLICATIONS

This application is a U.S. national stage application filed under 35 U.S.C. § 371 from International Application Serial No. PCT/EP2015/063286, which was filed 15 Jun. 2015, and published as WO2015/193222 on 23 Dec. 2015, and which claims priority to European Patent Office Application No. 14382226.0, filed 16 Jun. 2014, which applications and publication are incorporated by reference as if reproduced herein and made a part hereof in their entirety, and the benefit of priority of each of which is claimed herein.

TECHNICAL FIELD OF THE INVENTION

The present invention belongs to the field of systems for reproducing stereoscopic images by projection.

STATE OF THE ART

Devices for reproducing stereoscopic images are based on projecting a different two-dimensional image to each eye of each observer, such that the brain obtains the third dimension by means of processing these two two-dimensional images.

In movie theaters intended for a large number of observers, images are generally reproduced by means of either front or back projection.

In some cases, stereoscopic reproduction is achieved by projecting each image polarized linearly or circularly on a screen having the property of diffusing light without changing its polarization and using an also polarized discriminating filter arranged in front of each eye of each observer.

In other cases, the two images are projected on a conventional diffusing screen, and the images differ from one another either by their color (blue, green and red), like in anaglyphic systems, or by differentiating the three fundamental colors making up the color white (blue, red and green) by a different wavelength in each of the images, like in the Infitec® system. In these cases, it is also necessary to use discriminating filters, but colored this time, in front of the observers' eyes.

It is also common to use active discriminating filters, consisting of shutter glasses that allow the light through or suppress it, synchronizing this alternation with the projection of the two time-division-multiplexed images on a conventional screen.

All the previous systems have the drawback of requiring a discriminating filter, generally in the form of glasses, in front of each eye of each observer, which is a considerable nuisance, particularly for spectators who wear glasses, because they have to wear said discriminating filters in front of their own glasses. It further entails an additional cost due to the process for producing, transporting and/or cleaning these discriminating glasses.

BRIEF DESCRIPTION OF THE INVENTION

The present invention provides a solution to the problems mentioned in the preceding section by means of a system for reproducing stereoscopic images according to claim 1. The dependent claims define preferred embodiments of the invention.

The system for reproducing stereoscopic images according to the invention comprises a projection screen, at least one projector, a first optical device, a second optical device and a third optical device. The system of the invention is intended for reproducing stereoscopic images in a series of places intended for observing said images.

The first optical device is configured as a matrix of converging lenses, identical to one another, having a focal distance $f_1$ and arranged on a plane. The lenses of the first optical device have a depth of field of focus suitable for containing the optical center of the objective lens of the projector and the places intended for observing the images. Under these conditions, the focal distance $f_1$ is small enough with respect to projection and observation distances so as to enable considering that the images of the projector and of the places intended for observation are formed by the first optical device in its focal plane, i.e., in the plane consisting of the focal planes of the converging lenses.

The first optical device is located in front of and parallel to the projection screen, at a distance from the projection screen equal to twice the focal distance $f_1$.

The second optical device is configured as a matrix of converging lenses, identical to one another, having a focal distance $f_2$ equal to half the focal distance $f_1$ of the converging lenses of the first optical device. The second optical device is located between the first optical device and the projection screen, equidistant from and parallel to both, in the focal plane of the first optical device, i.e., at a distance $f_1$ from the first optical device.

The third optical device is configured as a matrix of discriminating elements, wherein each discriminating element includes a first discriminating filter configured for selecting a first stereoscopic pair image and a second discriminating filter configured for selecting the second stereoscopic pair image, both discriminating filters being superimposed one in front of the other. The third optical device is located between the second optical device and the projection screen, parallel to both and in contact with the second optical device.

For each lens of the first optical device there are a corresponding lens of the second optical device and a corresponding discriminating element of the third optical device.

Furthermore, in each discriminating element of the third optical device, the first discriminating filter has a plurality of apertures having a shape and size equal to the images of the places intended for observing the second stereoscopic pair image which are formed by the first optical device on said discriminating element. Similarly, the second discriminating filter in each discriminating element comprises a plurality of apertures having a shape and size equal to the images of the places intended for observing the first stereoscopic pair image which are formed by the first optical device on said discriminating element.

Advantageously, the system of the invention allows observing stereoscopic images without having to use polarized or colored glasses, thus increasing the quality and comfort in viewing the images, particularly for spectators who wear glasses. Furthermore, eye hygiene conditions are improved because glasses previously used by other observers do not have to be used and the invention reduces the costs associated with the use of these glasses.

Advantageously, the system of the invention allows a high degree of adaptability, which helps to implement it in any movie theater with minimal modifications.

Preferably, the lenses making up the first optical device are arranged in the matrix such that there are no gaps between contiguous lenses.

In one embodiment, the elements making up the first, second and third optical devices (converging lenses in the case of the first two devices and discriminating elements in the case of the third device) have polygonal shape, which polygons can be triangles, rectangles, pentagons, hexagons, etc.

Different embodiments of the discriminating elements of the third optical device are possible. Preferably:
- one of the discriminating filters is a polarizing filter adapted to perform linear light polarization in one direction, and the other discriminating filter is a polarizing filter adapted to perform light polarization in direction perpendicular to the polarization direction of the first discriminating filter, or
- one of the discriminating filters is a polarizing filter adapted to perform right-handed circular polarization, and the other discriminating filter is a polarizing filter adapted to perform left-handed circular polarization, or
- one of the discriminating filters in the anaglyphic system corresponds to the color blue or the color green, and the other discriminating filter in the anaglyphic system corresponds to the color red, or
- each of the discriminating filters has a different wavelength in each image for each of the three fundamental colors making up the color white, like in the Infitec® system.

In some embodiments, the system is intended for working by means of back projection, the projector being located on the side of the screen farthest from the three optical devices. In other embodiments, the system is intended for working by means of front projection, the projector being located on the same side of the screen as the places intended for observing the images, such that the three optical devices are arranged between the projector and the screen.

In one embodiment in which the system is intended for working by means of back projection, the projector is configured for emitting the two images making up of the stereoscopic pair such that they are discriminated from one another and time-division-multiplexed.

In one embodiment in which the system is intended for working by means of back projection, the system additionally comprises a second projector, the two projectors being located on the side of the screen farthest from the three optical devices, and each projector is configured for emitting one of the two images making up of the stereoscopic pair in a synchronized manner and such that they are discriminated from one another.

Preferably, in the embodiments in which the system is intended for working by means of back projection, the lenses of the first optical device, the lenses of the second optical device and the discriminating elements of the third optical device have the same shape and size, and the distance between the optical centers of two contiguous lenses of the second optical device and the distance between the geometric centers of two contiguous discriminating elements are equal to the distance between the optical centers of two contiguous lenses of the first optical device.

Preferably, in the embodiments in which the system is intended for working by means of front projection, the optical center of the lens of the second optical device and the geometric center of the discriminating element of the third optical device are located on the imaginary straight line joining the optical center of the corresponding lens of the first optical device with the optical center of the objective lens of the projector, and the ratio of the distance between the optical centers of two contiguous lenses of the first optical device and the distance between the optical centers of two contiguous lenses of the second optical device, or between the geometric centers of two contiguous discriminating elements of the third optical device, is equal to the ratio between the projection distance and the projection distance plus the focal distance $f_1$.

In one embodiment in which the system is intended for working by means of front projection, the projector is configured for emitting the two images making up of the stereoscopic pair such that they are discriminated from one another and time-division-multiplexed. In this embodiment, the second optical device has an aperture in each lens of the matrix located in the same position and having the same size as the image of the objective lens of the projector formed by the first optical device on said lens of the second optical device, and the third optical device has an aperture in the discriminating filters of each discriminating element located in the same position and having the same size as the aperture of the corresponding lens of the second optical device.

In one embodiment in which the system is intended for working by means of front projection, the system additionally comprises a second projector, the three optical devices being arranged between the projectors and the screen, and the two projectors being arranged such that the distance between the optical centers of their objective lenses is less than or equal to the size of the lenses of the first optical device, and each projector being configured for emitting one of the two images making up of the stereoscopic pair in a synchronized manner and such that they are discriminated from one another. In this embodiment, the second optical device has two apertures in each lens located in the same positions and having the same sizes as the images of the objective lenses of the projectors formed by the first optical device on said lens of the second optical device. Furthermore, the third optical device has two apertures in the discriminating filters of each discriminating element located in the same positions and having the same sizes as the apertures of the lenses of the second optical device.

In one embodiment in which the system is intended for working by means of front projection, the system additionally comprises a second projector, the three optical devices being arranged between the projector and the screen, and the two projectors being arranged such that the distance between the optical centers of their objective lenses is less than or equal to the size of the lenses of the first optical device, and each projector being configured for emitting one of the two images making up of the stereoscopic pair in a synchronized manner and without being discriminated. In this embodiment, the second optical device has two apertures in each lens located in the same positions and having the same sizes as the images of the objective lenses of the two projectors formed by the first optical device on said lens of the second optical device. Furthermore, the third optical device has an aperture in the first discriminating filter of each discriminating element having the same size and position as the image of the objective lens of a projector formed by the first optical device on said discriminating element of the third optical device, and the third optical device has an aperture in the second discriminating filter of each discriminating element having the same size and position as the image of the objective lens of the other projector formed by the first optical device on said discriminating element of the third optical device.

In one embodiment, the lenses of the first optical device, the lenses of the second optical device and the discriminating elements of the third optical device have the same shape.

In one embodiment, the lenses of the first optical device, the lenses of the second optical device and the discriminating elements of the third optical device have the same size.

In one embodiment, the lenses of the second optical device and the discriminating elements of the third optical device are arranged in the matrix adjacent to one another, without leaving gaps between contiguous lenses or discriminating elements, respectively.

All the features and/or method steps described in this specification (including the claims, description and drawings) can be combined in any combination, with the exception of combinations of such mutually exclusive features.

BRIEF DESCRIPTION OF THE DRAWINGS

To complement the following description and to aid in better understanding the features of the invention according to a preferred practical embodiment thereof, a set of drawings is attached as an integral part of said description in which the following is depicted with an illustrative and non-limiting character.

DETAILED DESCRIPTION OF THE INVENTION

The system according to the invention comprises three optical devices, the first two of which are configured as a matrix or mosaic of converging lenses, identical to one another, and the third optical device is configured as a matrix of discriminating elements, each discriminating element including a pair of discriminating filters superimposed one in front of the other.

For the sake of simplicity, FIGS. 1 to 8 show the performance of the elements of the system depicting the first and second optical device as a single converging lens each and the third optical device as a single discriminating element.

Figure 1:
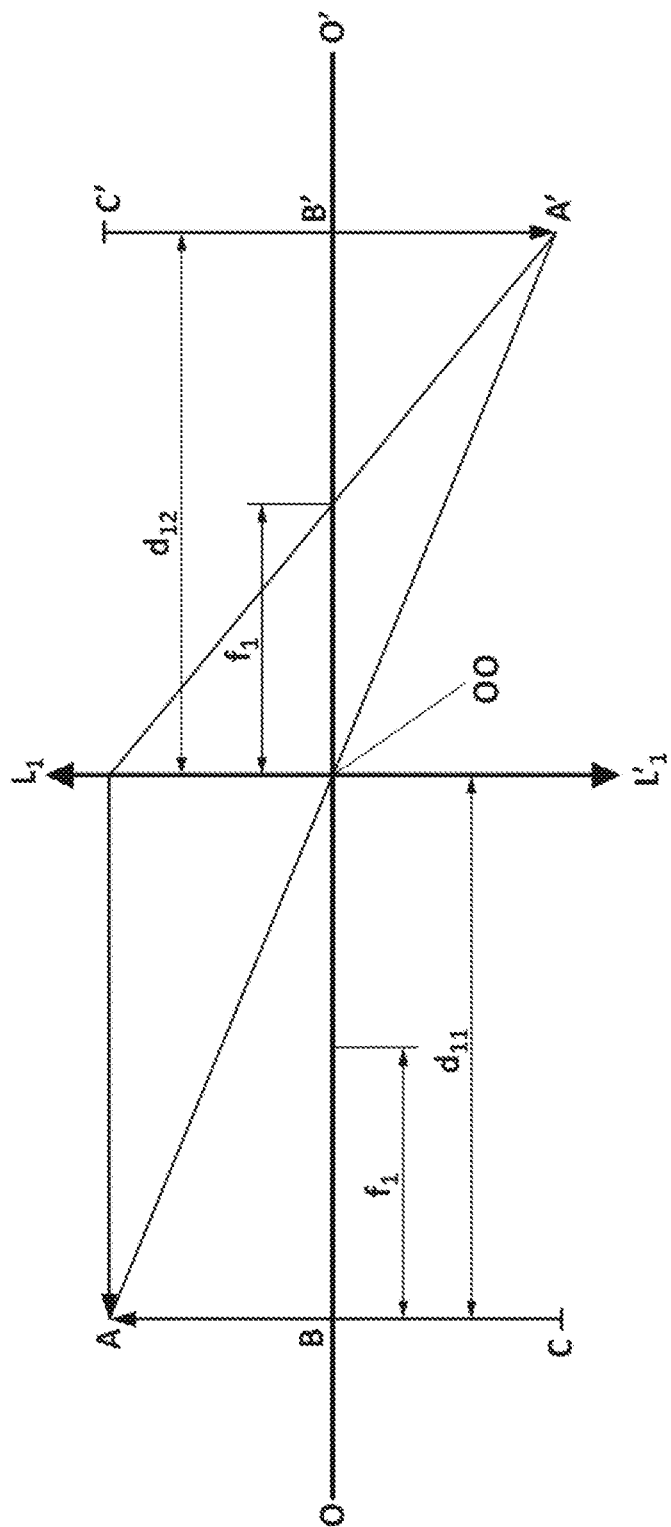
FIG. 1 shows the optical performance of a converging lens under the operating conditions of the first optical device and the second optical device of the system according to the invention.

FIG. 1 shows the optical performance of a converging lens $L_1L'_1$. If it is assumed that a luminous object ABC is located at a distance $d_{11}$ from the converging lens $L_1L'_1$ and that the light rays emitted by the luminous object are refracted by the lens $L_1L'_1$, an image C'B'A' of the luminous object will be formed with the refracted light rays at a distance $d_{12}$ from the lens $L_1L'_1$. If the converging lens $L_1L'_1$ is located at a distance from the object equal to twice the focal distance $f_1$, an inverted image having the same size as the object will be formed at a distance $d_{12}$ from the lens that is also equal to twice the focal distance.

Figure 2:
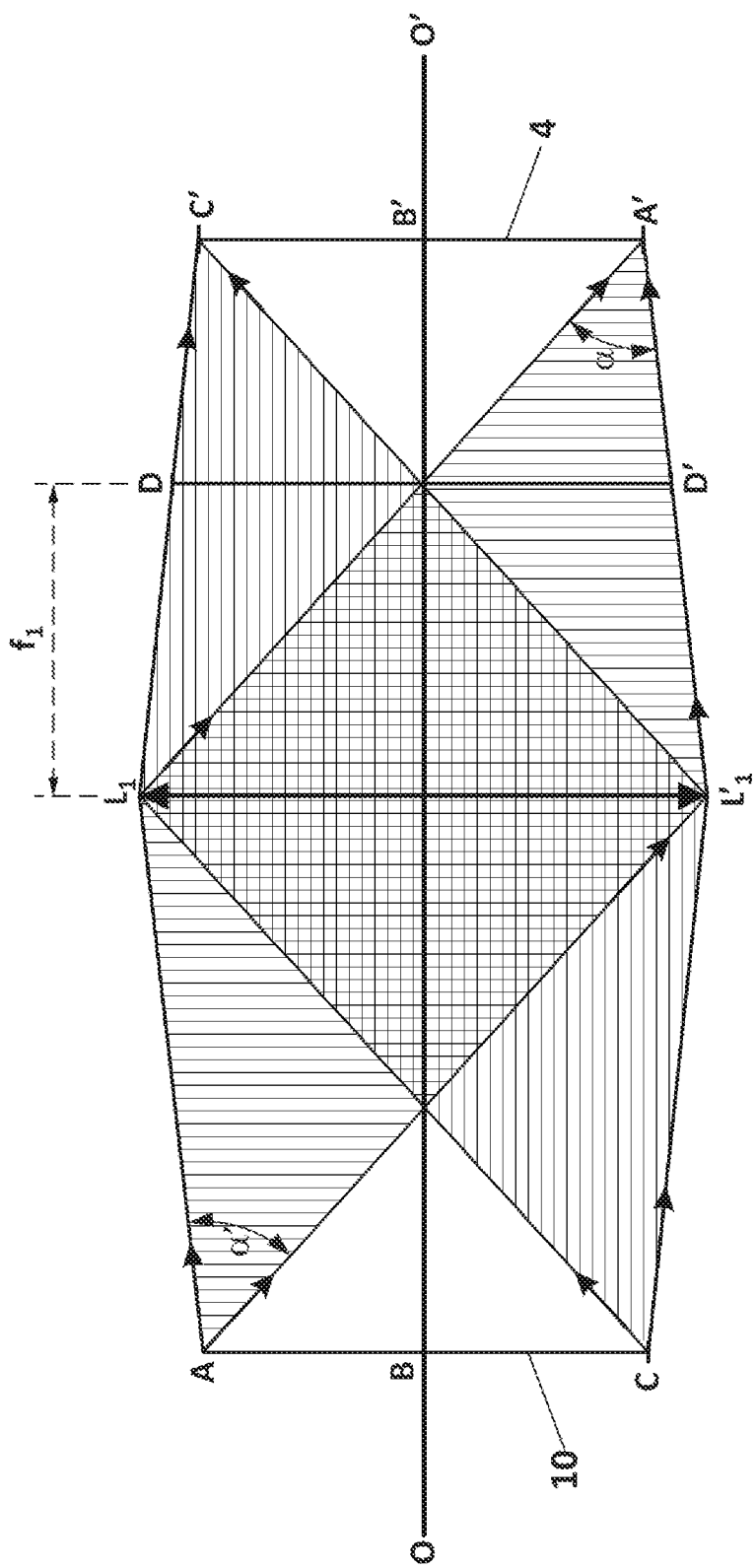
FIG. 2 shows the light beams going through a lens such as that shown in FIG. 1 when it receives rays from a luminous object formed on a diffusing surface.

FIG. 2 shows the light beams departing from the ends A and C of the object ABC when the latter is formed on a diffusing surface (10). If the distance from the object to the converging lens $L_1L'_1$ is equal to the distance shown in FIG. 1, light rays departing from point A and forwarding for the lens $L_1L'_1$ will form an angle α and after being refracted by the lens $L_1L'_1$ they will converge in point A', forming a convergent beam with the same angle α as before. Similarly, light rays departing from point C after going through the lens $L_1L'_1$ converge in point C'. It is important to observe that when the object ABC is formed on a diffusing surface (10), as shown in FIG. 2, the beam of rays forming the image C'B'A' takes up a surface having a size DD' located at the focal distance $f_1$ from the lens $L_1L'_1$.

Figure 3:
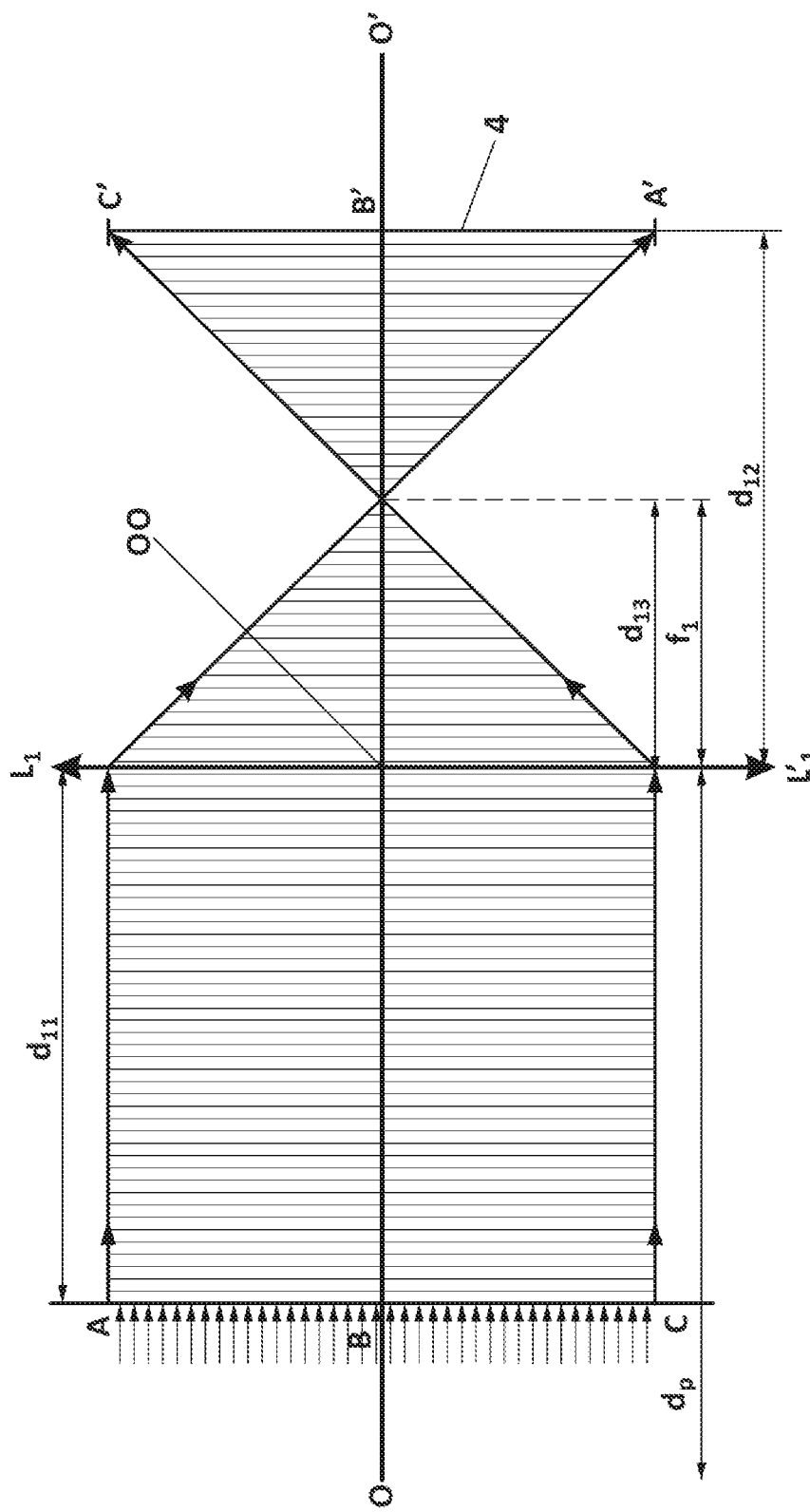
FIG. 3 shows the optical performance of a converging lens such as that shown in FIG. 1 when it receives rays from an image formed in the air by projection, acting like an optical object.

FIG. 3 illustrates the optical performance of the first optical device (1) making up the system according to the invention. The first optical device is configured as a matrix of converging lenses, identical to one another, and having a focal distance $f_1$. However, for the sake of simplicity it is depicted in FIG. 3 as a single converging lens having a focal distance $f_1$, such as that shown in FIG. 1, in front of which a luminous object ABC is arranged.

The luminous object ABC is formed in the air by means of projection and is located at a distance $d_{11}=2f_1$ from the first optical device. The light rays departing from the luminous object ABC and refracted by the first optical device will form the image C'B'A' on a diffusing screen (4) located at a distance $d_{12}=2f_1$ equal to the distance $d_{11}$ between the plane where luminous object ABC is formed and the first optical device.

The luminous object ABC is not formed on a diffusing screen (4), but rather is generated by projection from a projector (not depicted) located on the optical axis OO' of the lens $L_1L'_1$ and at a projection distance $d_p$ therefrom assumed to be much greater than the focal distance $f_1$. Under these conditions and according to the Gaussian function:

$$\frac{1}{d_p} + \frac{1}{d_{13}} = \frac{1}{f_1}$$

it is deduced that $$d_{13} = \frac{d_p f_1}{d_p - f_1} = \frac{1}{1 - \frac{f_1}{d_p}} f_1$$

If $d_p \gg f_1$, then $d_{13}=f_1$.

In other words, the image of the projector is formed in a place located at a distance $d_{13}$ almost equal to, though slightly greater than, the focal distance $f_1$, i.e., in a place which is located almost on the focal plane of the lens $L_1L'_1$ and at the intersection of said plane with the straight line joining the optical center of the objective lens of the projector with the optical center of the lens $L_1L'_1$. In the real case where the first optical device is configured as a matrix of converging lenses, each lens forms an image of the projector objective lens on a plane located at a distance $d_{13}$ that is the same for all the converging lenses making up the matrix and is almost equal to, though slightly greater than, the focal distance $f_1$.

Therefore, rays parallel to the straight line joining the optical center of the projector objective lens with the optical center of the lens $L_1L'_1$ pass through points A, B and C. In this figure this straight line coincides with the optical axis of the lens. The rays refracted by the lens $L_1L'_1$ subsequently pass through a point located in the focal plane of said lens. Then said rays form the image C'B'A' on the diffusing screen (4) located at a distance $d_{12}$ from the lens $L_1L'_1$, equal to the distance depicted in FIG. 1.

Figure 4:
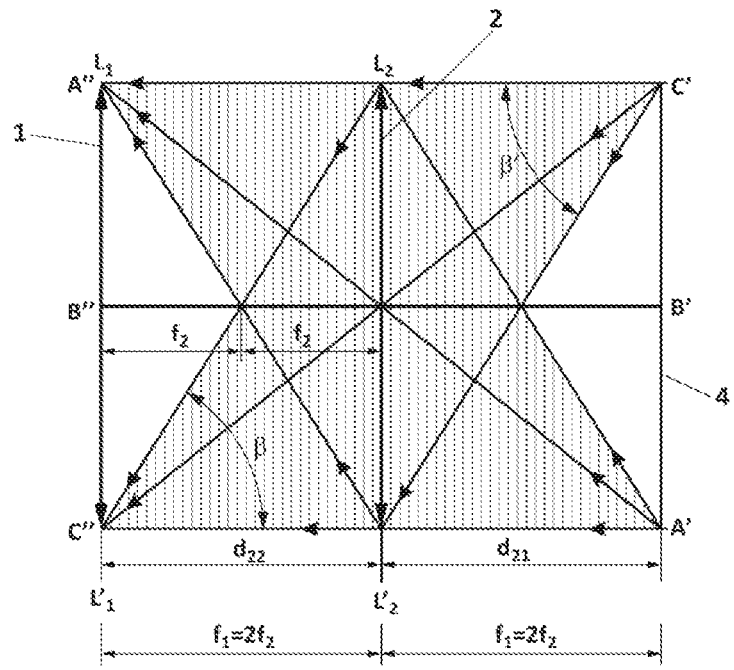
FIG. 4 illustrates the optical performance of the second optical device of the system according to the invention.

FIG. 4 shows the optical performance of the second optical device (2) of the system object of this invention. For the sake of simplicity, the second optical device (2) is depicted in this figure as a single converging lens $L_2L'_2$, the focal distance $f_2$ of which is equal to half the focal distance $f_1$ of the lens $L_1L'_1$, i.e., $f_2=f_1/2$. The lens $L_2L'_2$ is located parallel to the diffusing screen (4) and at a distance therefrom equal to twice the focal distance: $d_{21}=2f_2$, i.e., $d_{21}=f_1$.

The lens $L_2L'_2$ will operate under the same conditions as those explained in FIG. 1 if the image C'B'A' is formed on the diffusing screen (4). Therefore, the image C'B'A' will act as an optical object for the lens $L_2L'_2$, where said optical object is located at a distance $d_{21}$ from the lens $L_2L'_2$, said distance $d_{21}$ being twice the focal distance $f_2$ of the lens. Therefore, the rays from the object C'B'A' are refracted by the lens $L_2L'_2$ and form the inverted image A"B"C" having the same size as the object C'B'A'. Said image A"B"C" is located at a distance $d_{22}$ from the lens $L_2L'_2$ equal to twice the focal distance $f_2$ of the lens, i.e., at the distance $d_{22}=2f_2=f_1$. The beam of rays originating from point C' with angle β converge in point C" under the same angle β after said rays are refracted by the lens $L_2L'_2$.

Figure 5:
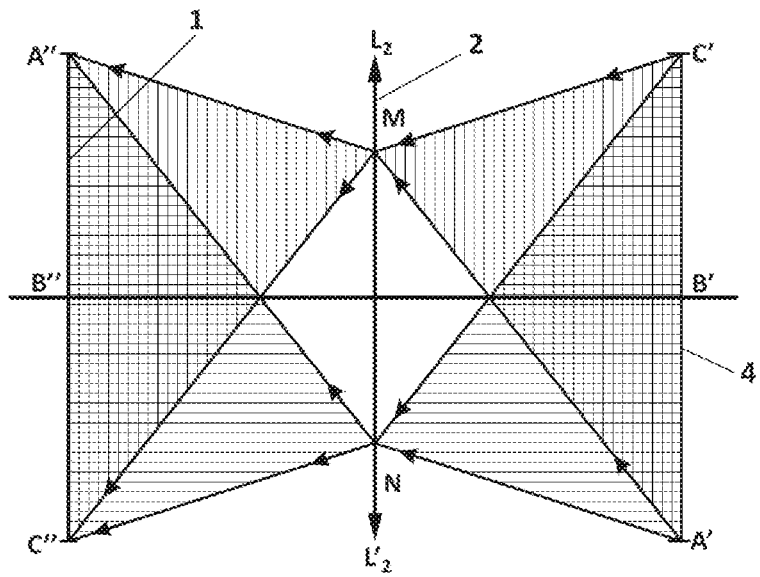
FIG. 5 shows the performance of two different light beams striking the second optical device of the system according to the invention.

FIG. 5 shows the first optical device (1) and second optical device (2), each depicted as a converging lens, and a diffusing screen (4). The first optical device (1) forms the image C'B'A' on the diffusing screen (4). This figure depicts two light beams emitted by the diffusing screen (4). One of the depicted beams departs from the image C'B'A' and passes through point M of the second optical device (2). The second beam passes through point N. After being refracted by the second optical device (2), both beams form the same image A"B"C" on the first optical device (1).

Figure 6:
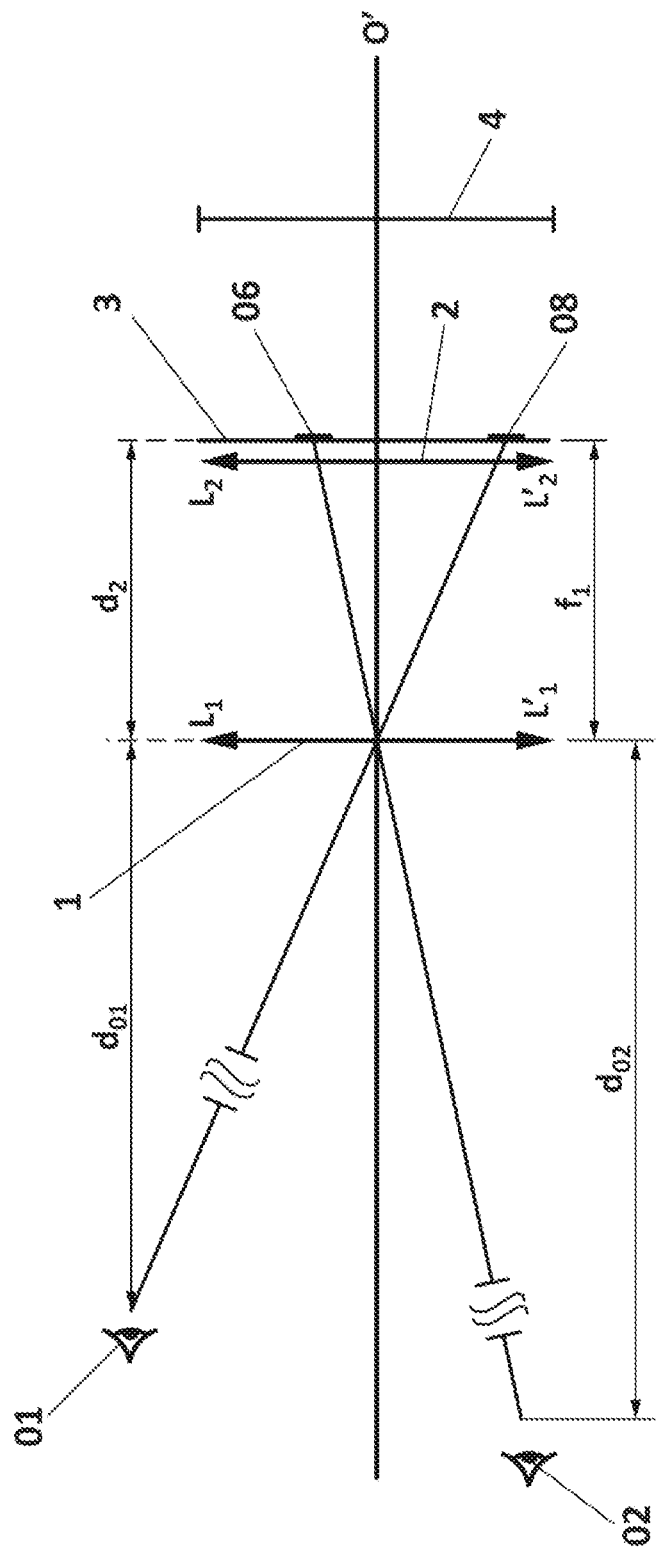
FIG. 6 illustrates the optical operation of the third optical device of the system according to the invention.

FIG. 6 illustrates the operating foundations of the third optical device (3) of the system of the invention. The two observers' eyes (01, 02) are located, respectively, at distances $d_{01}$, $d_{02}$ from the first optical device depicted for the sake of simplicity as a single converging lens $L_1L'_1$, where each of said distances $d_{01}$, $d_{02}$ is assumed to be much greater than the focal distance $f_1$ of the first optical device (1). When these circumstances arise, as explained in reference to FIG. 3, the images of the observers' eyes, considered as optical objects for the first optical device (1), are formed at points (06, 08), in a plane located at a distance $d_2$ from the first optical device (1), said distance $d_2$ being able to be considered equal to the distance $d_{13}$ described in relation to FIG. 3, which is slightly greater than the focal distance $f_1$, i.e., both the observers' eyes and the optical centers of the projection objective lenses are within the field of focus or depth of field of the lens $L_1L'_1$. The third optical device (3) of the system object of this invention is located in said plane, i.e., in contact with the second optical device. FIG. 6 depicts the second optical device and third optical device depicted separately from one another in order to see them better.

Figure 7:
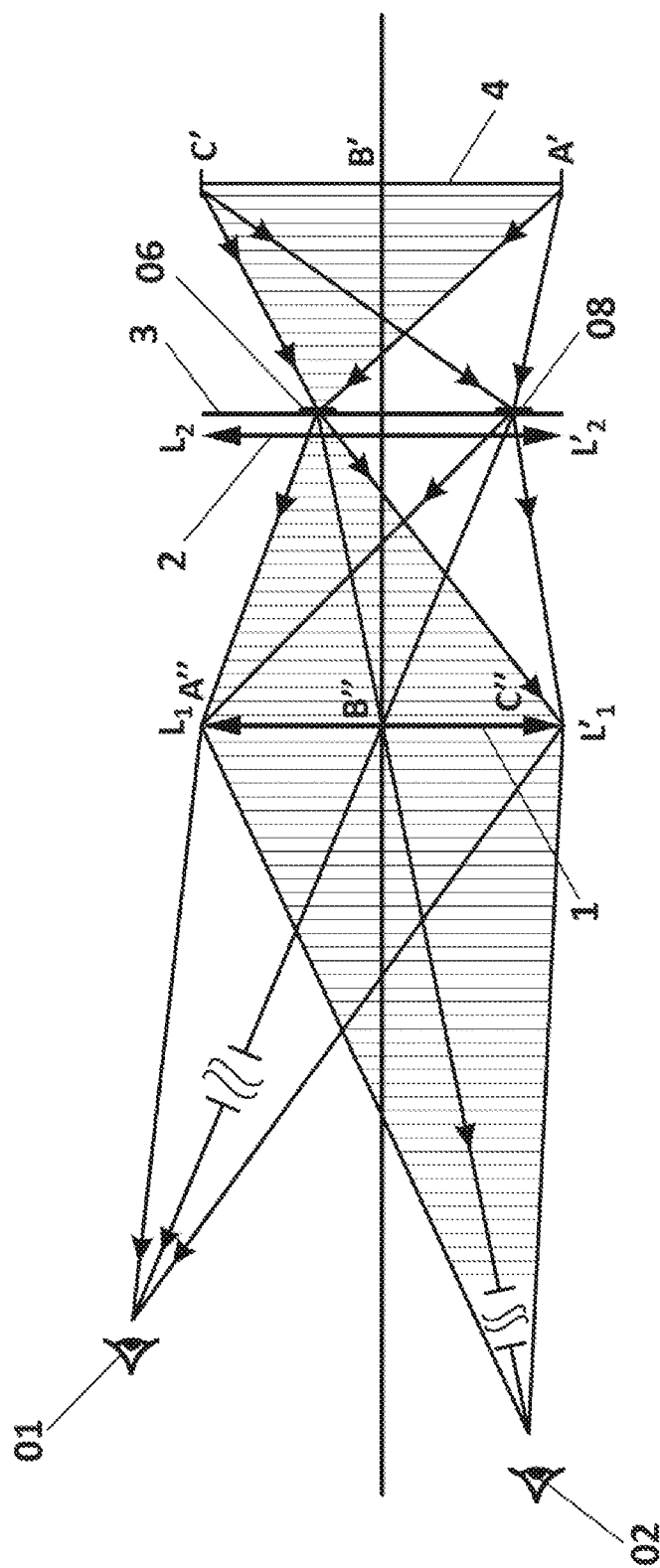
FIG. 7 shows the convergence of a beam of light rays on an observer's eye.

FIG. 7 shows the beam of rays from the optical object C'B'A' passing through point (06), in which the image of the observer's eye (02) is formed, and converging in the eye (02) after forming the image A"B"C" on the first optical device (1).

Figure 8A:
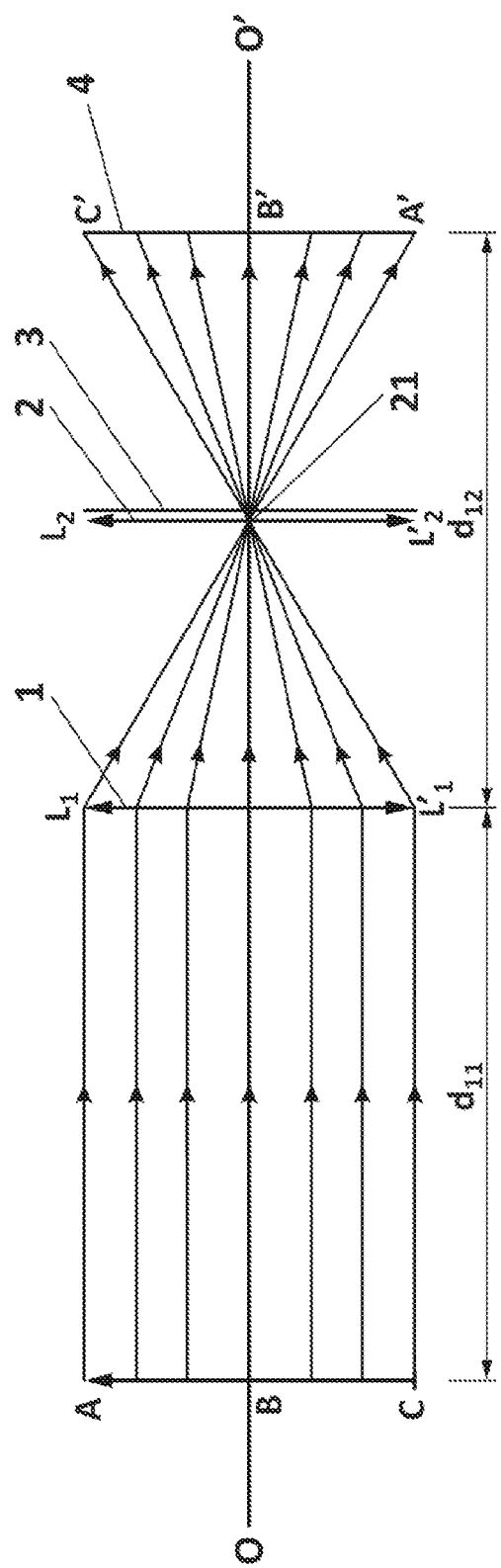
FIGS. 8A-8C schematically show the arrangement of the three optical devices of the system of the invention.
Figure 8B:
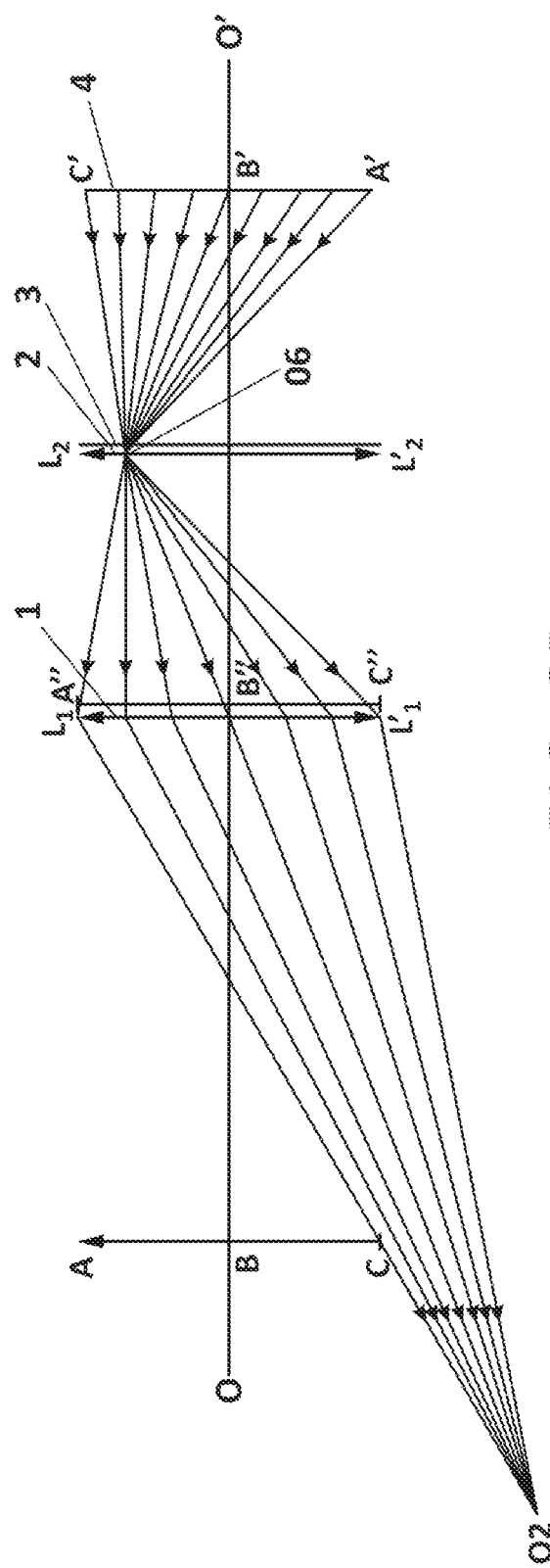
Figure 8C:
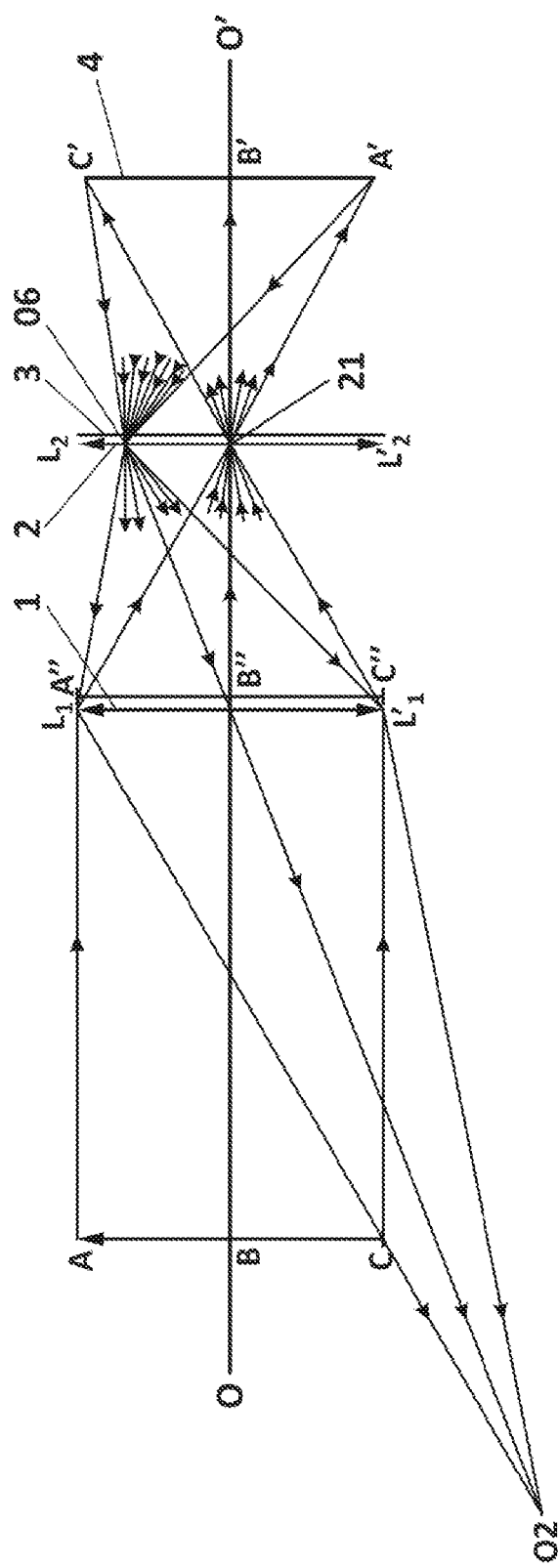

FIGS. 8A-8C schematically show the complete operation of the system according to the invention. Like in the preceding drawings, the first optical device (1) and the second optical device (2) are depicted respectively by means of a converging lens, and the third optical device (3) is also depicted schematically.

FIG. 8A shows that the image ABC formed in the air by a projector (not depicted in the drawing), located far enough away from the first optical device (1), on a point of the optical axis OO' of the first optical device (1). The image ABC works as an optical object for the first optical device (1), forming an inverted image C'B'A' having the same size as the object ABC on the projection screen (4), as explained in reference to FIG. 3. Said screen (4) is a projection or back projection screen that does not change polarization in the diffusion process. The distance $d_{12}$ between the screen (4) and the first optical device (1) is equal to twice the focal distance $f_1$ of the first optical device (1). Interposing the second optical device (2) in the focal plane of the first optical device (1) does not change the passage of rays coming from the first optical device (1) towards the right side of the drawing because these rays converge on the second optical device (2) through an almost pinpoint-sized aperture (21) made in the second optical device (2). The second optical device has a focal distance $f_2$ equal to half the focal distance of the first optical device, $f_2=f_1/2$.

FIG. 8B shows how the beam of rays departing from the object C'B'A' passes through point (06) pertaining to the third optical device (3), and the first optical device (1) focuses said beam of rays in the observer's eye (02), said eye (02) therefore seeing the image A"B"C" on the first optical device (1).

FIG. 8C shows the complete performance of the first optical device (1) of the system. On one hand, after the beam of rays goes through the aperture (21) in the second optical device (2), the first optical device (1) forms the inverted image C'B'A' on the diffusing screen (4) with said beam of rays going from left to right from the image ABC formed in the air by a non-depicted projector. Furthermore, the first optical device (1) gets the beam of rays going from right to left from the image C'B'A' and going through the third optical device (3) through point (06) to converge in the observer's eye (02), such that said eye (02) will see the image A"B"C" on the first optical device (1).

Figure 9A:
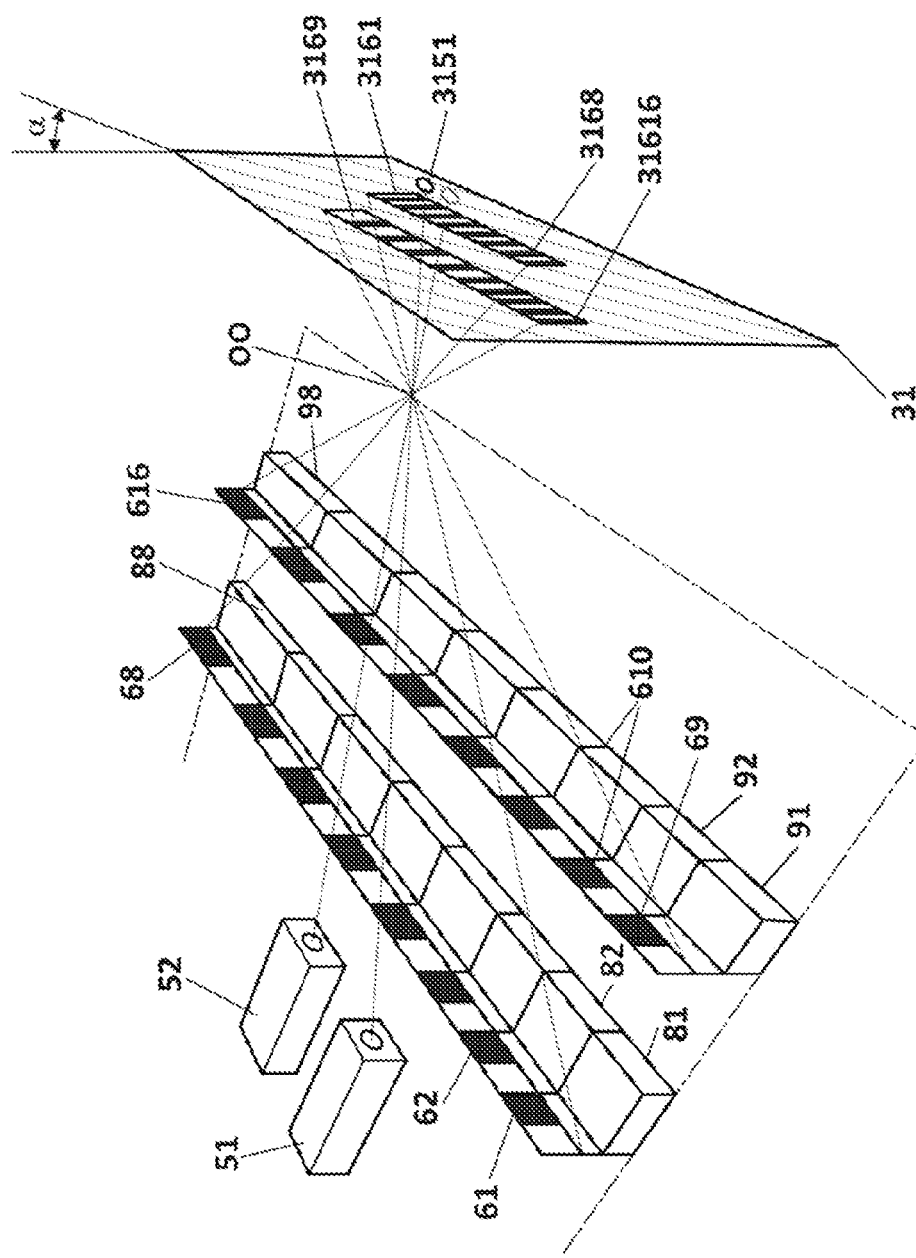
FIGS. 9A-9B show the operation of the third optical device making up the system according to the invention and its adaptation to a specific stereoscopic projection room.
Figure 9B:
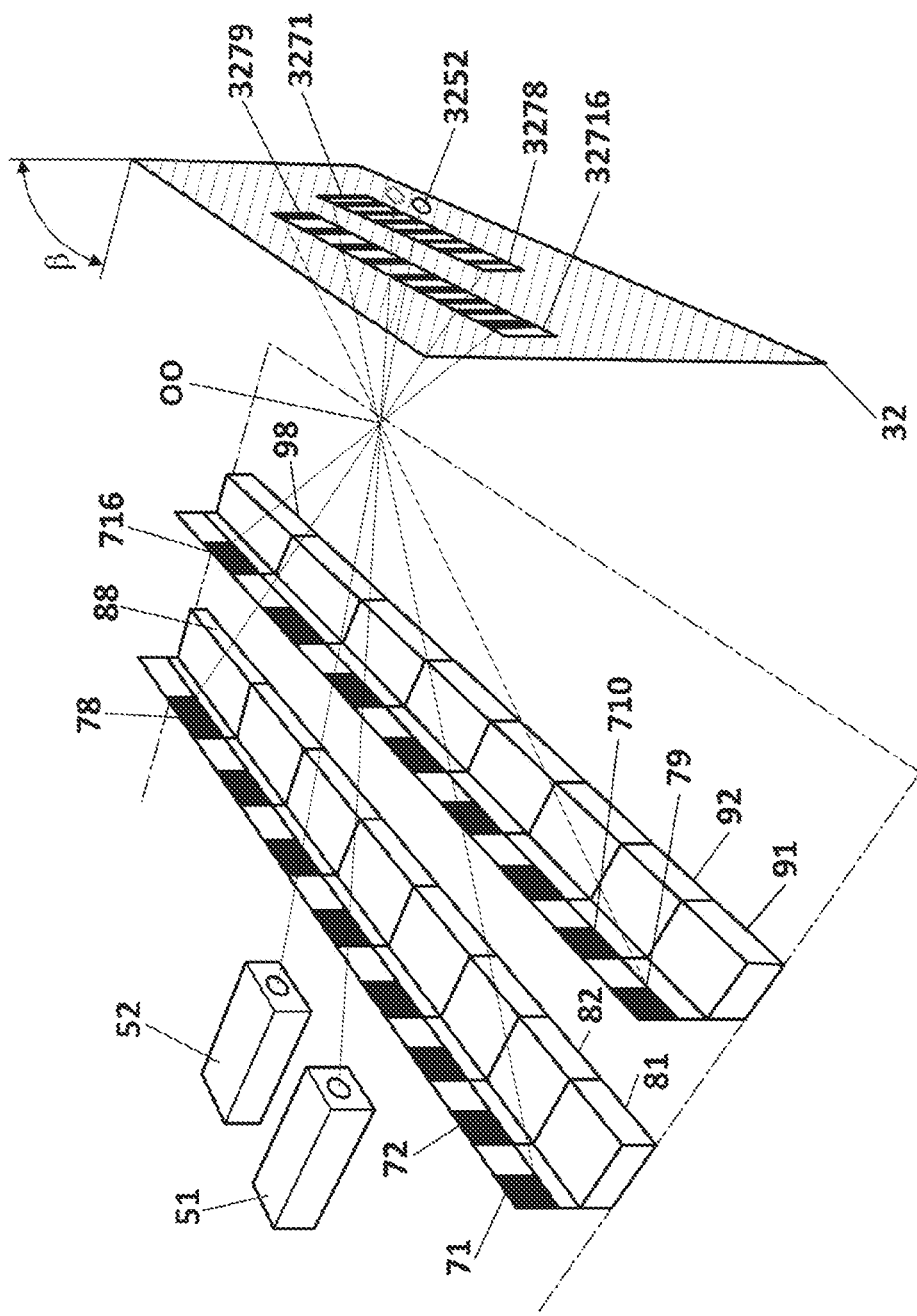

FIGS. 9A-9B schematically show the operation of the third optical device (3) of the system object of this invention. These drawings help to understand how the third optical device (3) adapts to the features of each projection room. To that end, such projection room is one that is intended for reproducing stereoscopic images, in this case through two projectors (51, 52) each configured for reproducing one of the stereoscopic pair images. Said room has a series of seats (81, 82, . . . 88, 91, 92, . . . 98) located in fixed places and intended so that observers attending the projection can sit in them. The third optical device (3) is constructed according to the set of specific elements (seats, type of projection and number of projectors) in each room.

FIG. 9A shows the right side of the back of each seat by means of a black rectangle (61, 62, ... 68, 69, ... 616) covering the right half of the back. FIG. 9B shows the same number of rectangles (71, 72, ... 78, 79, ... 716) taking up the left side of the back of each seat. Said right and left rectangles represent the places where the images making up the stereoscopic pair are to be observed, corresponding to observers' right and left eyes. In FIGS. 9A-9B, for the sake of simplicity the third optical device is depicted as a single large-sized discriminating element, including two discriminating filters (31, 32), arranged one after the other on the optical path of the light from the projectors (51, 52).

The images of the rectangles of the seats and of the projection objective lens of one of the projectors are captured through the lens $L_1L'_1$ (not depicted), the optical center (OO) of which is depicted in FIG. 9A-9B. In FIG. 9A, the first discriminating filter (31) has apertures with the position and size of the projections, through the first optical device, of the images of the right rectangles (3161, ... 3168, 3169, ... 31616) corresponding to the right half of the backs (61, ... 68, 69, ... 616), and of the projection from the objective lens of one of the projectors (3151). FIG. 9B also shows apertures having a size and position equal to the projection, through the first optical device, of the left rectangles (3271, ... 3278, 3279, ... 32716) corresponding to the left half of the backs (71, ... 78, 79, ... 716) of the projection from the objective lens of the other projector (3252) on the second discriminating filter (32).

Alternatively, the positions the apertures must take up in the discriminating filters of the third optical device can be determined by means of simple geometric calculations, by capturing the image of the room and of the projectors with a conventional camera and based on the knowledge of the distances between the image capture position and the rectangles in which the stereoscopic images are to be projected. The images of the rectangles and of the projectors on the discriminating filters (31, 32) will become apertures having the same shape and size on the discriminating filters.

The set of the preceding discriminating filters (31, 32) make up the third optical device (3). In order to see each of the two images making up the stereoscopic pair from any other area of the projection room, the corresponding conjugated apertures will be arranged in the discriminating filters (31, 32).

In the embodiment shown in FIGS. 9A-9B, the discriminating filter (31) is a filter configured for performing linear light polarization in direction "α" and the discriminating filter (32) is a filter configured for performing linear light polarization in direction "β" perpendicular to the previous direction "α".

Figure 10:
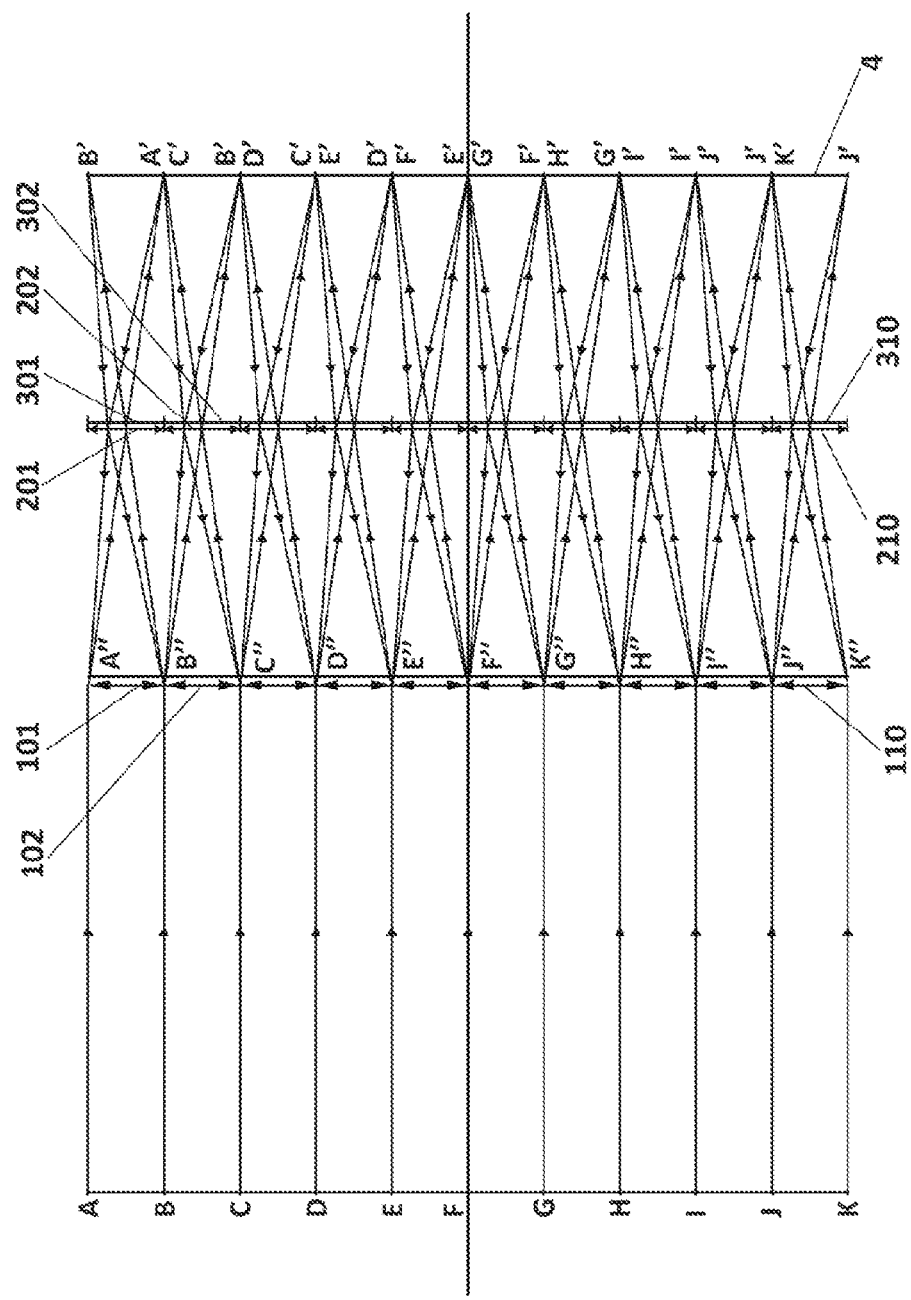
FIG. 10 shows an embodiment of the system according to the invention with front projection.

FIG. 10 schematically depicts the system of the invention, in which the first optical device (1) and the second optical device (2) are depicted as a matrix of lenses, instead of as two single lenses. In the drawings discussed above, for the sake of simplicity the first optical device (1) and the second optical device (2) were each depicted as a single lens, the first optical device (1) represented by lens $L_1L'_1$ and the second optical device (2) represented by lens $L_2L'_2$. In said situation, in order to cover an ordinary projection screen (4) with each lens, said lenses would have to be at least the size of the screen. Since the focal distances of the lenses are proportional to their size, the complete system would be considerably bulky. Therefore, the first optical device (1) and the second optical device (2) of the invention each comprise a smaller-sized mosaic or matrix of converging lenses, as schematically depicted in FIG. 10, and the third optical device has a matrix of discriminating elements.

If in the case of a single lens the image ABC projected in the air in FIG. 8C is made up of images AB and BC, in FIG. 10, the image that is projected can be considered to be made up of a plurality of images (AB, BC, CD, DE, ... JK). As discussed above, the first optical device (1) and the second optical device (2) each has a plurality of lenses (101, 102, ... 110; 201, 202, ... 210) arranged forming a matrix on respective imaginary planes perpendicular to the plane of the drawing. In this embodiment, the lenses of the first device and of the second device are arranged in the matrix without leaving gaps between lenses.

In this embodiment, with front projection, the ratio of the distance between the optical centers of two contiguous lenses of the second optical device (2) and the distance between the optical centers of two contiguous lenses of the first optical device (1) is equal to the ratio of the focal distance $f_1$ plus the projection distance $(f_1+d_p)$ and the projection distance $(d_p)$. The size and shape of the discriminating elements of the third optical device (3) is equal to the size and shape of the lenses making up the second optical device (2).

The images formed by the first optical device (1) on the screen (4) are formed by the same number of image rectangles (B'A', B'C', C'D', ... K'J') as there are lenses in the first optical device (1). These image rectangles (B'A', B'C', C'D', ... K'J') each represents a portion of the original image ABC and is each inverted with respect to the portions of the original image (AB, BC, CD, ... JK). Each of the image rectangles (B'A', B'C', C'D', ... K'J') acts as an optical object for each of the lenses (201, 202, 203, ... 210) of the second optical device (2), in turn forming the image (A"B", B"C", C"D", ... J" K") on the corresponding lens of the first optical device (1). Therefore, the set of images (A"B", B"C", C"D", ... J" K") formed on the first optical device makes up the complete image ABC.

In one embodiment in which the system is implemented with back projection, instead of projecting the image in the air in front of the first optical device (1) so that the lenses of the first optical device (1) can form the corresponding inverted images (B'A', B'C', C'D', ... K'J') on the screen, the inverted image (B'A', B'C', C'D', ... K'J') of each rectangle duly polarized or colored would be projected on the back projection screen (4). The rest of the operation is similar to that described, i.e., the lenses of the second optical device form the images (A"B", B"C", C"D", ... J"K"), which are inverted with respect to the images reproduced on screen, on the first optical device (1) that converges the images on the observers' eyes.

Preferably, in one embodiment with back projection, the lenses of the first optical device (1) and of the second optical device (2) have the same size and the same polygonal shape, and the distance between the optical centers of two contiguous lenses of the second optical device (2) is equal to the distance between the optical centers of two contiguous lenses of the first optical device (1). The size and shape of the discriminating elements (3) is equal to the size and shape of the lenses making up the second optical device (2).

Figure 11:
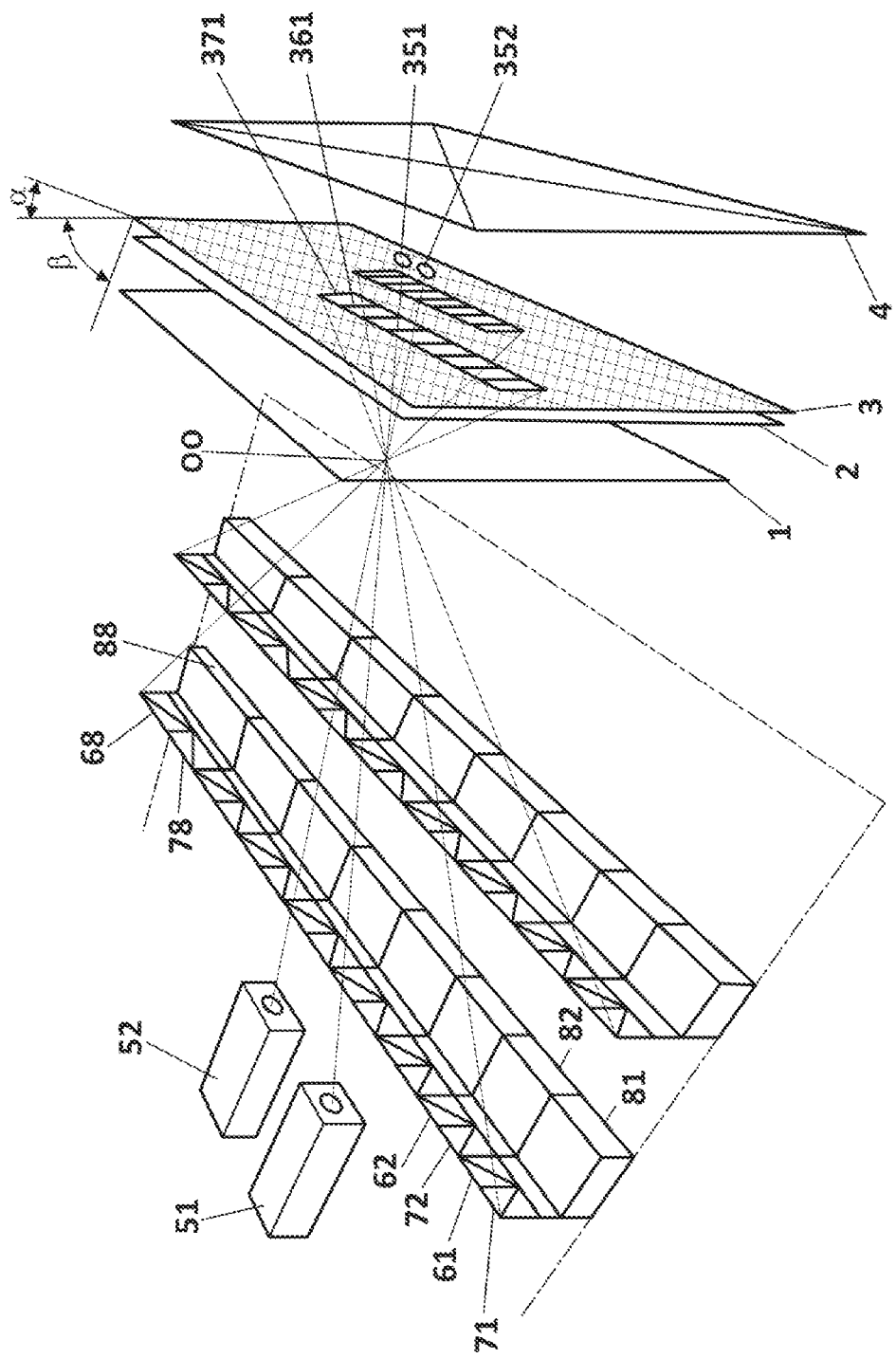
FIG. 11 shows the operation of the system according to the invention in a stereoscopic projection room.

FIG. 11 shows the operation of the system of the invention in a stereoscopic projection room with two projectors (51, 52). For the sake of simplicity, the first optical device (1), second optical device (2) and third optical device (3) are depicted as three large-sized rectangles. The second optical device (2) has a pair of apertures located on the axis of projection or straight line joining the optical center of the objective lens of each projector (51, 52) with the optical center of the lens of the first optical device (1), respectively. The third optical device is made up of two superimposed polarizing filters (31, 32) which are not shown in the drawing, one filter having an aperture (351) located on the axis of projection or straight line joining the optical center of a projector with the optical center of the lens of the first optical device, and the other filter having an aperture (352) located on the axis of projection or straight line joining the optical center of the other projector with the optical center of the lens of the first optical device. Both filters are configured for polarizing the light in opposite manners with respect to one another, for example, if the first filter performs left-handed circular light polarization, the second filter performs right-handed circular light polarization.

Furthermore, a first discriminating filter comprises a plurality of apertures having a shape and size equal to the images of the places intended for observing a stereoscopic pair image that are formed by the first optical device on the discriminating element, and the other discriminating filter comprises a plurality of apertures having a shape and size equal to the images of the places intended for observing the other stereoscopic pair image that are formed by the first optical device on the discriminating element.

Each of the projectors (51, 52) projects one of the images making up the stereoscopic pair, for example, a first projector (51) projects the image corresponding to the left eye and the second projector (52) projects the image corresponding to the right eye.

The first optical device (1) will refract all the rays from the second projector (52) passing through and focused by the aperture present in the second optical device. The rays then go through the first discriminating filter of the third optical device (3), where they are polarized, and subsequently go through the second discriminating filter through the aperture (352) made therein. The rays from the second projector going from left to right in the drawing are therefore polarized under the action of the first discriminating filter before they are projected on the screen (4). Something similar occurs with the rays from the first projector (51), which are refracted by the first optical device (1) and go through the corresponding aperture made in the second optical element, then going through the first discriminating filter through the aperture (351) made for such purpose, and being polarized under the action of the second discriminating filter before reaching the screen (4). The two stereoscopic pair images are thus discriminated by means of the third optical device as the images coming from each projector are polarized in opposite manners.

Then, the images projected on the screen (4), which are already polarized, go through the third optical device (3) along the path of the rays going from right to left in the drawing, such that the stereoscopic pair images having a given polarization go through the discriminating filter having the opposite polarization through the apertures intended for such purpose, corresponding to the places for observing said image, whereas the discriminating filter having the same polarization as the images act as the discriminating glasses used in the state of the art.

The images are subsequently picked up the second optical device (2), which projects the polarized images on the first optical device (1). The first optical device (1) in turn projects the luminous rectangles with the content of the two stereoscopic images on the backs of the seats intended for the observers (61, 71, 62, 72, ... 68, 78), getting the observers' eyes located somewhere in the first rectangles (61, 62, 63, ... 68) to receive the image projected by the first projector (51) and getting the eyes located in the second rectangles (71, 72, 73, ... 78) to receive the image projected by the second projector (52). Observers whose eye is located in a first rectangle (6x) and whose other eye is located in a second rectangle (7x) will receive a 3D stereoscopic view. If both eyes are located within one and the same rectangle (6x) or (7x), the observer will see a correct image but it will be two-dimensional, or 2D, view.

As mentioned, FIG. 11 is specific to front stereoscopic projection with two projectors (51, 52), each of which projects one of the stereoscopic pair images without discriminating same. In this case, the images are polarized before they are reproduced on the screen (4), as they go through the discriminating filter (31, 32) corresponding to each image. As discussed above, these discriminating filters (31, 32) can polarize light linearly or circularly, or they can be color filters like in anaglyphic or Infitec® systems. In cases of color discrimination, the screen (4) is a conventional screen.

When stereoscopic projection is performed by means of two projectors projecting already discriminated stereoscopic pair images, it is not necessary to perform discrimination as it goes through the third optical device (3) on the path going from left to right in the drawing. In that case, both discriminating filters (31, 32) have an aperture corresponding to the image of the objective lens of each projector, the rays passing through said apertures without changing polarization or color.

In the case in which the stereoscopic projection is performed by means of a single projector by time-division-multiplexing, i.e., projecting the first duly polarized or colored pair image in one instant and projecting the second image with the opposite polarization or color in the next instant, discrimination does not have to be performed as it goes through the third optical device (3) on the path going from left to right in the drawing. In that case, each discriminating filter (31, 32) has a single aperture corresponding to the image of the objective lens of the single projector, the rays passing through said aperture without changing polarization or coloration.

The invention claimed is:

1. A system for reproducing stereoscopic images comprising:
    a projection screen;
    at least one projector having an objective lens;
    a first optical device, comprising a matrix of converging lenses, identical to one another, having a focal distance $f_1$, and each converging lens having an optical center, the first optical device being located in front of and parallel to the projection screen, at a distance from the projection screen equal to twice the focal distance $f_1$, and in which the converging lenses have a depth of field of focus suitable for containing the places intended for observing the images and an optical center of the objective lens of the projector;
    a second optical device located in the focal plane of the first optical device and comprising a matrix of converging lenses, identical to one another, each converging lens having an optical center and having a focal distance $f_2$ equal to half the focal distance $f_1$ of the converging lenses of the first optical device, the second optical device being located between the first optical device and the projection screen, equidistant from and parallel to both; and
    a third optical device located between the second optical device and the projection screen, parallel to both and in contact with the second optical device, said third optical device comprising a matrix of discriminating elements, each discriminating element having a geometric center, wherein each discriminating element includes a first discriminating filter configured for selecting a first stereoscopic pair image and a second discriminating filter configured for selecting the second stereoscopic pair image, both discriminating filters being superimposed one in front of the other, wherein there is one converging lens of the second optical device and one discriminating element of the third optical device for each converging lens of the first optical device, and wherein in each discriminating element of the third optical device, the first discriminating filter comprises a plurality of apertures having a shape and size equal to the images of the places intended for observing the second stereoscopic pair image which are formed by the first optical device on said discriminating element, and the second discriminating filter comprises a plurality of apertures having a shape and size equal to the images of the places intended for observing the first stereoscopic pair image which are formed by the first optical device on said discriminating element.

2. The system according to claim 1, wherein the projector is located on the side of the screen farthest from the three optical devices, the system therefore working by means of back projection, and wherein the distance between the optical centers of two contiguous converging lenses of the second optical device and the distance between the geometric centers of two contiguous discriminating elements of the third optical device are equal to the distance between the optical centers of two contiguous converging lenses of the first optical device.

3. The system according to claim 2, wherein the projector is configured for emitting the two images making up the stereoscopic pair such that they are discriminated from one another and time-division-multiplexed.

4. The system according to claim 2, wherein the system additionally comprises a second projector which is also arranged to work by means of back projection, and wherein each projector is configured for emitting one of the two images making up the stereoscopic pair in a synchronized manner and such that they are discriminated from one another.

5. The system according to claim 1, wherein the three optical devices are arranged between the projector and the screen, the projector therefore working by means of front projection, wherein the optical center of each converging lens of the second optical device and the geometric center of each discriminating element of the third optical device are arranged on the imaginary straight line joining the optical center of the corresponding converging lens of the first optical device with the optical center of the objective lens of the projector, wherein the distance between the optical centers of two contiguous converging lenses of the second optical device is equal to the distance between the geometric centers of two contiguous elements of the third optical device, wherein a ratio of the distance between the optical centers of two contiguous converging lenses of the second optical device and the distance between the optical centers of two contiguous converging lenses of the first optical device is equal to a ratio of the focal distance $f_1$ plus a projection distance $(f_1+d_p)$ and a projection distance $(d_p)$, and wherein the second optical device has an aperture in each converging lens, the aperture being located in a same position and having a same size as an image of the objective lens of the projector formed by the first optical device on said converging lens of the second optical device.

6. The system according to claim 5, wherein the projector is configured for emitting the two images making up the stereoscopic pair such that they are discriminated from one another and time-division-multiplexed, and the third optical device has an aperture in the discriminating filters of each discriminating element, the aperture being located in a same position and having a same size as the aperture of the corresponding converging lens of the second optical device.

7. The system according to claim 5, wherein the system additionally comprises a second projector also arranged for working by means of front projection, the second projector having an objective lens with an optical center, the two projectors being arranged such that the distance between the optical centers of their objective lenses is less than or equal to a size of the converging lenses of the first optical device, and the second optical device has a second aperture in each converging lens, the second aperture being located in a same position and having a same size as an image of the objective lens of the second projector formed by the first optical device on said converging lens of the second optical device.

8. The system according to claim 7, wherein each projector is configured for emitting one of the two images making up the stereoscopic pair in a synchronized manner and such that they are discriminated from one another, and the third optical device has two apertures in the discriminating filters of each discriminating element located in the same position and having the same size as the apertures of the corresponding converging lens of the second optical device which correspond to the images of the objective lenses of the two projectors.

9. The system according to claim 7, wherein each projector is configured for emitting one of the two images making up the stereoscopic pair in a synchronized manner and without being discriminated, and the third optical device has an aperture in the first discriminating filter of each discriminating element having the same size and position as the image of the objective lens of a projector formed by the first optical device on said discriminating element of the third optical device, and the third optical device has an aperture in the second discriminating filter of each discriminating element having the same size and position as the image of the objective lens of the other projector formed by the first optical device on said discriminating element of the third optical device.

10. The system according to claim 1, wherein in the first optical device, the converging lenses are arranged adjacent to one another without leaving gaps between the converging lenses.

11. The system according to claim 1, wherein the converging lenses of the first optical device, the converging lenses of the second optical device and the discriminating elements of the third optical device have a polygonal shape, preferably a triangular, rectangular, pentagonal or hexagonal shape.

12. The system according to claim 1, wherein the converging lenses of the first optical device, the converging lenses of the second optical device and the discriminating elements of the third optical device have the same shape.

13. The system according to claim 1, wherein the converging lenses of the first optical device, the converging lenses of the second optical device and the discriminating elements of the third optical device have the same size.

14. The system according to claim 1, wherein the converging lenses of the second optical device and the discriminating elements of the third optical device are arranged in their respective matrixes adjacent to one another without leaving gaps between contiguous converging lenses or discriminating elements, respectively.

15. The system according to claim 1, wherein in the discriminating elements of the third optical device:
- one of the discriminating filters is a polarizing filter adapted to perform linear light polarization in one direction, and the other discriminating filter is a polarizing filter adapted to perform light polarization in direction perpendicular to the polarization direction of the first discriminating filter, or
- one of the discriminating filters is a polarizing filter adapted to perform right-handed circular polarization, and the other discriminating filter is a polarizing filter adapted to perform left-handed circular polarization, or
- one of the discriminating filters in the anaglyphic system corresponds to the color blue or the color green, and the other discriminating filter in the anaglyphic system corresponds to the color red, or
- each of the discriminating filters has a different wavelength in each image for each of the three fundamental colors making up the color white.

\* \* \* \* \*